(12) United States Patent
Enokido

(10) Patent No.: US 8,689,855 B2
(45) Date of Patent: Apr. 8, 2014

(54) TIRE VULCANIZING MOLD MANUFACTURING METHOD, AND TIRE VULCANIZING MOLD

(75) Inventor: Kenji Enokido, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 14/009,552

(22) PCT Filed: Apr. 10, 2012

(86) PCT No.: PCT/JP2012/059796
§ 371 (c)(1),
(2), (4) Date: Oct. 3, 2013

(87) PCT Pub. No.: WO2012/141175
PCT Pub. Date: Oct. 18, 2012

(65) Prior Publication Data
US 2014/0020859 A1    Jan. 23, 2014

(30) Foreign Application Priority Data

Apr. 14, 2011  (JP) ................................. 2011-090153
Apr. 14, 2011  (JP) ................................. 2011-090157

(51) Int. Cl.
*B22C 9/00* (2006.01)
*B22C 7/00* (2006.01)

(52) U.S. Cl.
USPC ................................ 164/23; 164/45; 164/235

(58) Field of Classification Search
USPC ........... 164/6, 15, 23, 45, 137, 159, 235, 271; 249/56
See application file for complete search history.

(56) References Cited

U.S. PATENT DOCUMENTS

| 7,874,821 B2 | 1/2011 | Ohara |
| 2013/0196014 A1 | 8/2013 | Enokido |

FOREIGN PATENT DOCUMENTS

| JP | 2000-229322 A | 8/2000 |
| JP | 2005-193577 A | 7/2005 |
| JP | 2007-038426 A | 2/2007 |
| JP | 2008-260135 A | 10/2008 |
| JP | 2009-269363 A | 11/2009 |
| JP | 2012-024992 A | 2/2012 |

*Primary Examiner* — Kevin P Kerns
(74) *Attorney, Agent, or Firm* — Carrier Blackman & Associates, P.C.; Joseph P. Carrier; William D. Blackman

(57) ABSTRACT

A tire vulcanizing mold manufacturing method for manufacturing of a mold including a vent mechanism, and a tire vulcanizing mold manufactured using such method are disclosed. Blades each with anchor portions are mounted on a plaster mold with only the anchor portions embedded in the plaster mold. A portion of each blade mounted on the plaster mold is covered with a cover layer made of a destructible fire-resistant material. Molten metal is poured over a surface of the plaster mold to cast a mold to which the shape of the surface is transferred and in which each blade is buried. The anchor portions protruding from the surface of the mold are removed, and the cover layer is removed to form a slit around the blade. A vent opening forming member is removed to form a vent opening. The slit and the vent opening communicate with each other.

16 Claims, 18 Drawing Sheets

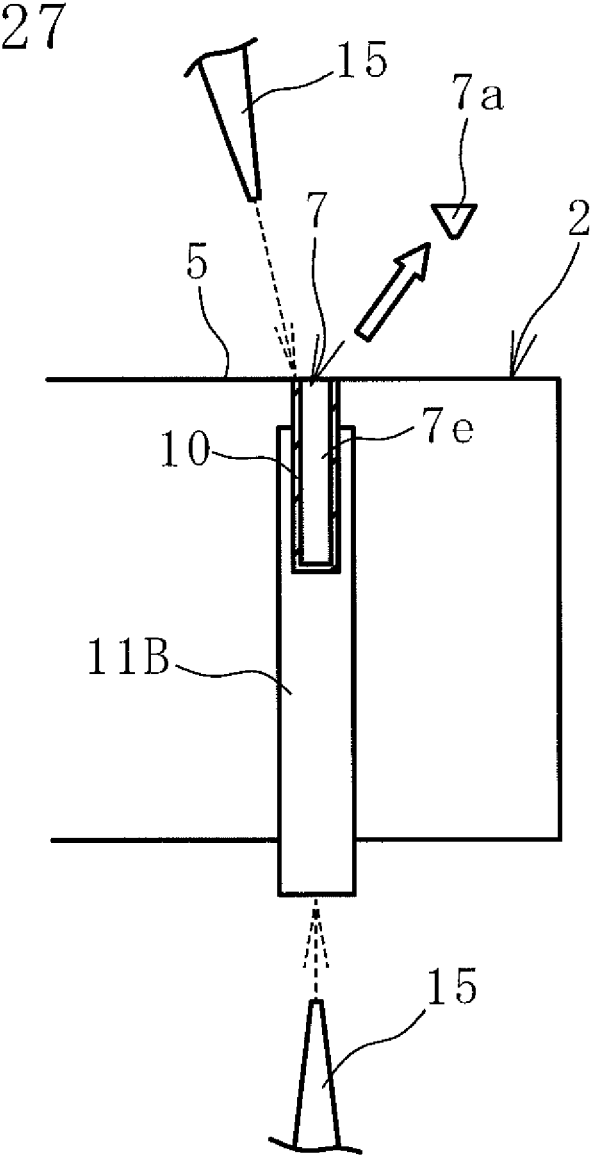

TIRE VULCANIZING MOLD MANUFACTURING METHOD, AND TIRE VULCANIZING MOLD

TECHNICAL FIELD

The present invention relates to a tire vulcanizing mold manufacturing method and a tire vulcanizing mold, and relates more specifically to a tire vulcanizing mold manufacturing method which allows simple manufacturing of a mold including a vent mechanism and to a tire vulcanizing mold.

BACKGROUND ART

Tire vulcanizing molds are provided with vent mechanisms which discharge air left between a green tire and the mold and gas resulting from vulcanizing to the outside of the mold. Heretofore, various types of vent mechanisms which develop no spews have been proposed (see Patent Documents 1 and 2, for example).

Patent Document 1 proposes a vent mechanism using a laminated blade which is a thin plate bent such that end portions on one side are superposed with each other while an end portion on the other side secures a large gap therein so that sufficient venting can be secured. This laminated blade is held by a block, and this block is fitted in a recessed pocket in the tire molding surface of the mold, thereby forming a vent chamber surrounded by the pocket and the block. Air and gas are discharged into the vent chamber through a small gap between the one end portions of the laminated blade and the large gap in the other end portion. However, this vent mechanism requires: a step of forming the pocket in the tire molding surface of the mold after its casting; a step of making an assembly being the block holding the laminated blade; and a step of fitting this assembly into the pocket. Thus, the number of processing steps is increased, causing a problem of increased manufacturing time.

Patent Document 2 proposes multiple, separate shots of molten metal at the time of casting each piece that forms a mold. The cast piece has a small gap formed in the cast boundary between shots due to solidification shrinkage of the molten metal. This gap serves as a vent path. However, since this proposal requires multiple, separate shots of molten metal, the number of processing steps is increased, causing a problem of increased manufacturing time.

PRIOR ART DOCUMENT

Patent Documents

Patent Document 1: Japanese patent application Kokai publication No. 2008-260135
Patent Document 2: Japanese patent application Kokai publication No. 2000-229322

SUMMARY OF THE INVENTION

Problem to be Solved by the Invention

An object of the present invention is to provide a tire vulcanizing mold manufacturing method allowing simple manufacturing of a mold including a vent mechanism and to provide a tire vulcanizing mold manufactured by this manufacturing method.

Means for Solving the Problem

To achieve the above object, a tire vulcanizing mold manufacturing method of the present invention is a tire vulcanizing mold manufacturing method of manufacturing a mold to which a surface shape of a plaster mold is transferred by pouring molten metal over a surface of the plaster mold and solidifying the molten metal, characterized in that the method comprises the steps of: mounting a blade on the surface of the plaster mold, the blade being provided with an anchor portion protruding from one end thereof and mounted in such a way that only the anchor portion is embedded in the plaster mold; covering a portion of the blade mounted on the surface of the plaster mold with a cover layer made of an easily destructible fire-resistant material; pouring molten metal over the surface of the plaster mold thus obtained to cast a mold to which the surface shape of the plaster mold is transferred and in which the blade is buried; removing the anchor portion protruding from a surface of the mold; removing the cover layer to form a slit around the blade; and making the slit communicate with a vent opening connected to an outside of the mold.

Another tire vulcanizing mold manufacturing method of the present invention is a tire vulcanizing mold manufacturing method of manufacturing a mold to which a surface shape of a plaster mold is transferred by pouring molten metal over a surface of the plaster mold and solidifying the molten metal, characterized in that the method comprises the steps of: covering a portion of a blade protruding from the surface of the plaster mold with a cover layer made of an easily destructible fire-resistant material, the portion of the blade being a portion protruding from the surface of the plaster mold; attaching a rod-shaped vent opening forming member upright to the blade in such a way that the vent opening forming member comes in contact with the cover layer, the vent opening forming member being made of an easily destructible fire-resistant material; pouring molten metal over the surface of the plaster mold thus obtained to cast a mold to which the surface shape of the plaster mold is transferred and in which the portion of the blade protruding from the surface of the plaster mold and the vent opening forming member are buried; removing the cover layer to form a slit around the blade; and removing the vent opening forming member to form a vent opening communicating with the slit and extending toward a back surface of the mold.

A tire vulcanizing mold of the present invention is a tire vulcanizing mold which is manufactured by solidifying molten metal and which has a blade embedded in a tire molding surface without protruding therefrom, characterized in that the mold comprises: a slit formed around the blade by removing a cover layer covering the blade after the mold is cast, the cover layer being and made of an easily destructible fire-resistant material; and a vent opening allowing the slit to communicate with an outside of the mold.

Another tire vulcanizing mold of the present invention is a tire vulcanizing mold which is manufactured by solidifying molten metal and which has a blade embedded in a tire molding surface, characterized in that the mold comprises: a slit formed around the blade; and a vent opening extending toward a back surface of the mold and allowing the slit to communicate with an outside of the mold, wherein the slit is formed by removing, after the mold is cast, a cover layer made of an easily destructible fire-resistant material and covering the blade having been buried in the molten metal, and the vent opening is formed by removing, after the mold is cast, a rod-shaped vent opening forming member made of an easily destructible fire-resistant material and having been buried in the molten metal.

Effects of the Invention

According to the former tire vulcanizing mold manufacturing method of the present invention, the blade with the anchor portion protruding from one end thereof is mounted on the surface of the plaster mold with only the anchor portion embedded in the plaster mold. Thus, the blade can be fixed and placed at a desired position. Moreover, the portion of the blade mounted on the surface of the plaster mold is covered with the cover layer made of an easily destructible fire-resistant material. Molten metal is poured over the surface of the plaster mold to cast the mold to which the surface shape of the plaster mold is transferred and in which the blade is buried. Then, the anchor portion protruding from the surface of the mold and the cover layer are removed. In this way, the slit can be formed around the blade by simple operation. Thereafter, the slit thus formed is made to communicate with the vent opening connected to the outside of the mold. Accordingly, a vent mechanism including a slit opening at the surface of the mold at a desired position can be formed.

With this manufacturing method, the former tire vulcanizing mold of the present invention including the vent mechanism can be obtained easily.

According to the latter tire vulcanizing mold manufacturing method of the present invention, the portion of the blade protruding from the surface of the plaster mold is covered with the cover layer made of an easily destructible fire-resistant material, the portion of the blade being a portion protruding from the surface of the plaster mold. Moreover, the rod-shaped vent opening forming member made of an easily destructible fire-resistant material is attached upright to the blade in such a way that as to be in contact with the cover layer. Then, molten metal is poured over the surface of the plaster mold thus obtained to cast the mold to which the surface shape of the plaster mold is transferred and in which the portion of the blade protruding from the surface of the plaster mold and the vent opening forming member are buried. Thereafter, the cover layer and the vent opening forming member are removed to form the slit around the blade and the vent opening communicating with the slit and extending toward the back surface of the mold. In this way, the operation for forming the slit and the vent opening which serve as a vent mechanism is simplified.

With this manufacturing method, the latter tire vulcanizing mold of the present invention including the vent mechanism can be obtained easily.

BRIEF DESCRIPTION OF THE DRAWINGS

FIG. 27 is a cross-sectional view illustrating a step of removing the anchor portions, cover layers, and the vent opening forming members from a sector after its casting.

MODES FOR CARRYING OUT THE INVENTION

Figure 1:
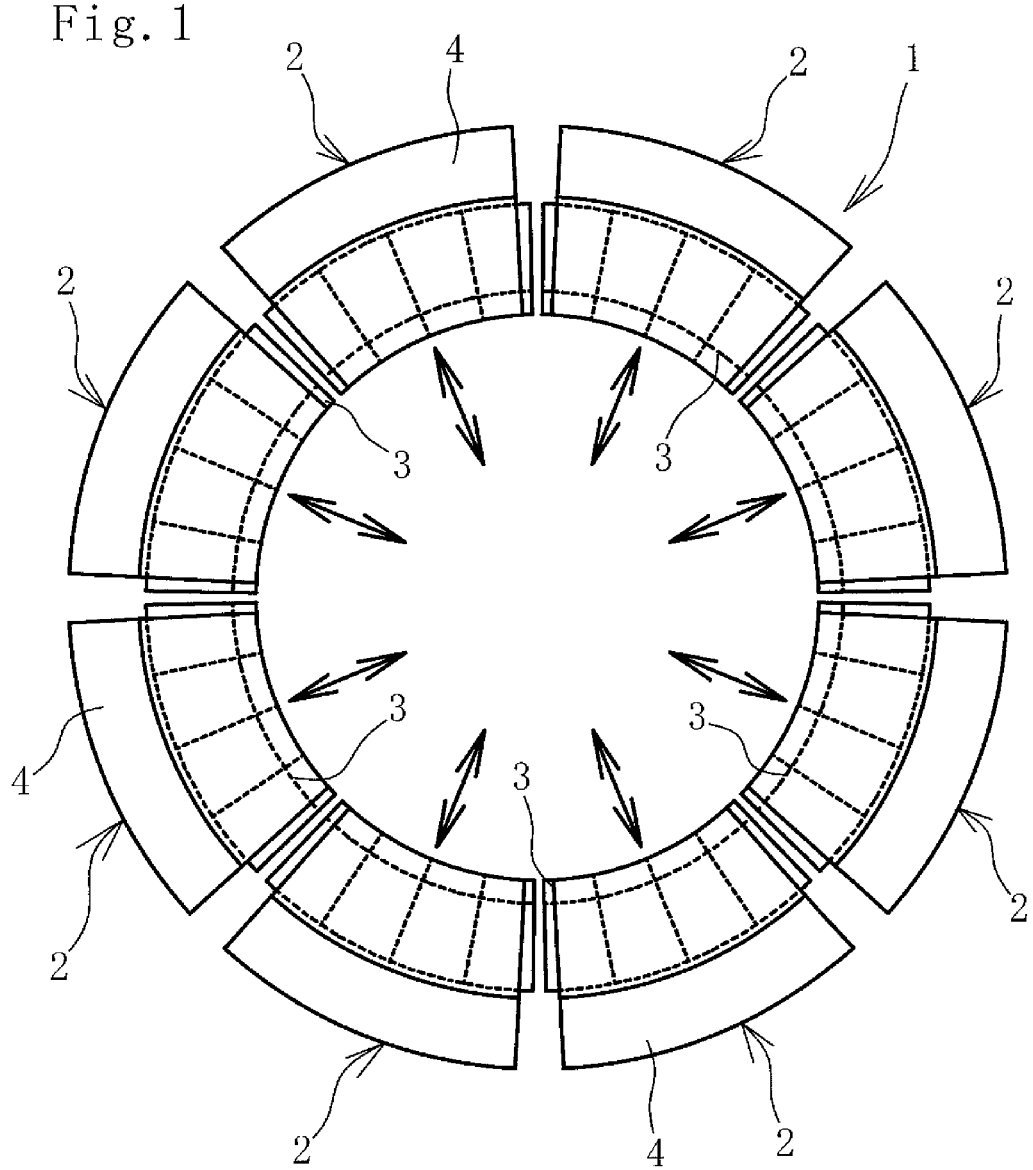
FIG. 1 is a plan view illustrating a tire vulcanizing mold of the present invention.

Hereinbelow, tire vulcanizing mold manufacturing methods and tire vulcanizing molds of the present invention will be described based on embodiments shown in the drawings. Arrows C, R, and W shown in drawings respectively indicate the circumferential direction, the radial direction, and the width direction of a green tire to be inserted and vulcanized in the vulcanizing molds.

Figure 2:
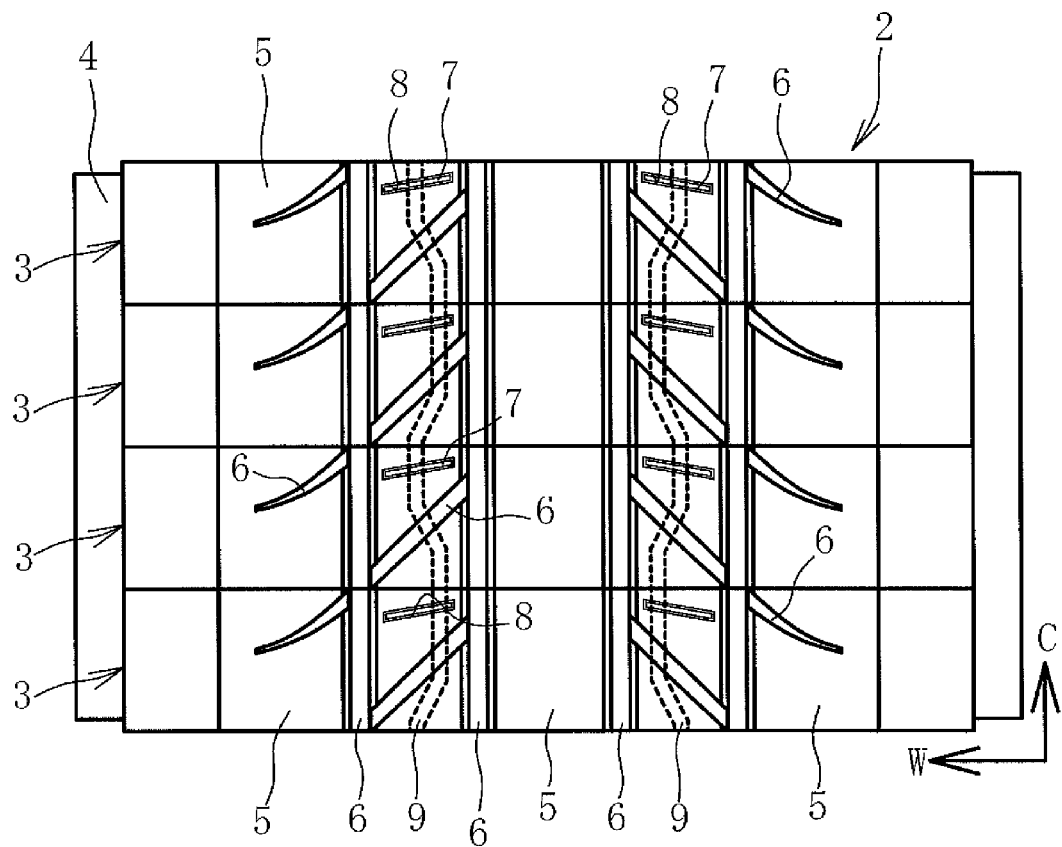
FIG. 2 is a plan view illustrating a sector in FIG. 1.
Figure 3:
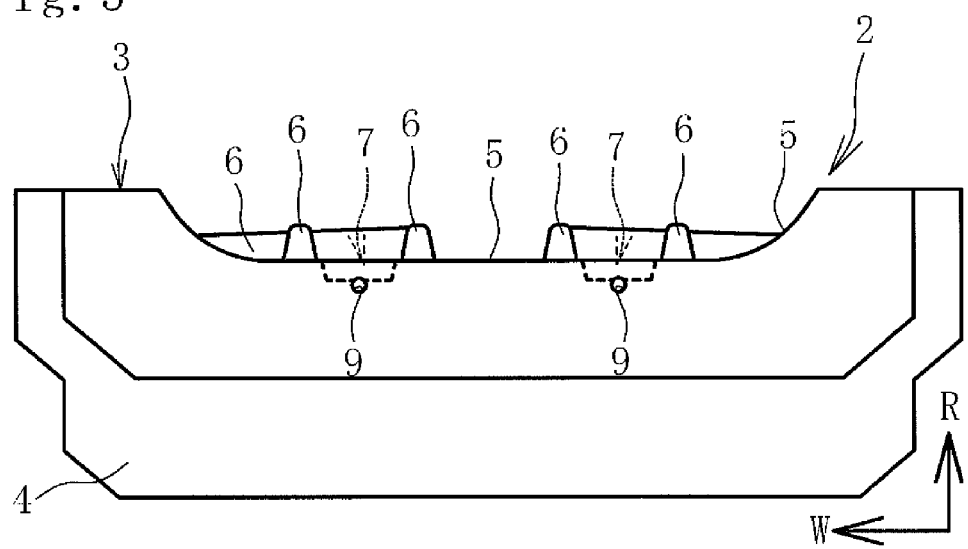
FIG. 3 is a front view of FIG. 2.

As illustrated in FIG. 1, a tire vulcanizing mold 1 (hereinafter, the mold 1) of the present invention is a sectional type formed of multiple sectors 2 assembled annularly. As illustrated in FIGS. 2 and 3, each sector 2 is formed of multiple pieces 3 and a back block 4, and each piece 3 is attached to the back block 4 while being in intimate contact with the adjacent piece(s) 3. In this embodiment, four pieces 3 rectangular in a plan view are fixed to one sector 2. The inner peripheral surfaces of the pieces 3 serve as a tire molding surface 5. Each piece 3 is formed by solidifying molten metal M being a metal material such as aluminum or an aluminum alloy in a molten state.

Figure 4:
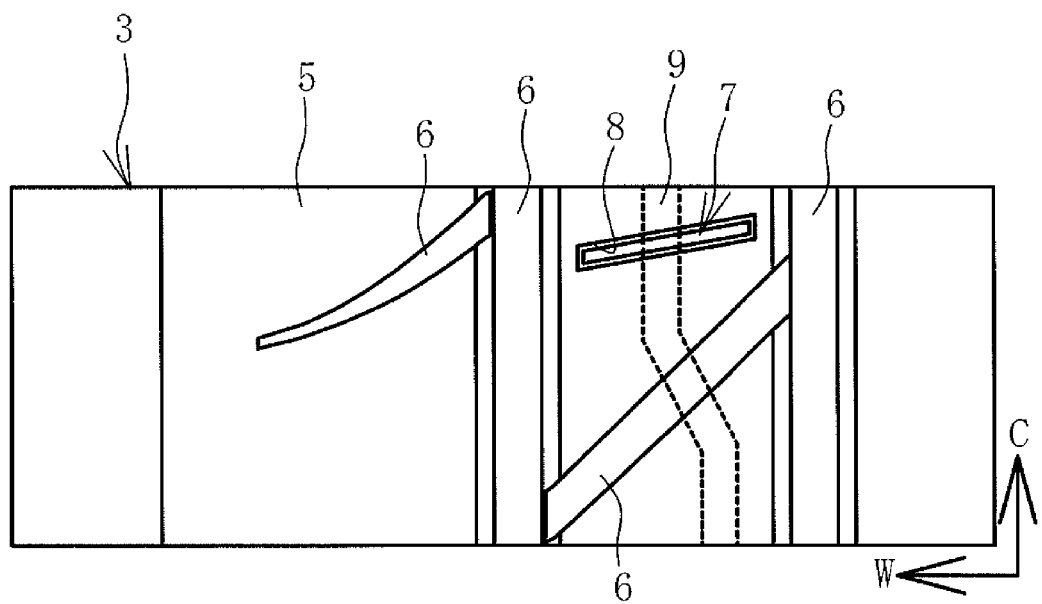
FIG. 4 is a plan view illustrating a left half of a piece in FIG. 3.
Figure 5:
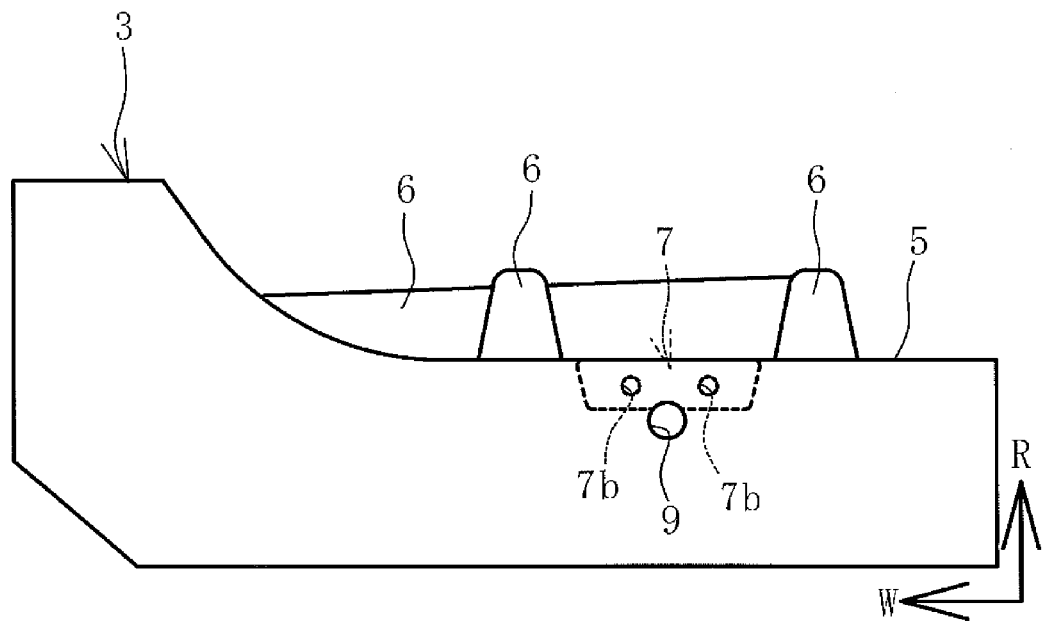
FIG. 5 is a front view of FIG. 4.

As illustrated in FIGS. 4 and 5, on the tire molding surface 5, groove molding protrusions 6 for forming a tire's grooves are provided integrally with the pieces 3. Moreover, blades 7 made of stainless steel or the like are embedded and buried in the tire molding surface 5 without protruding therefrom. The thickness of the blades 7 is about 0.4 mm to 1.2 mm.

A slit 8 is provided around each blade 7. This slit 8 is formed by removing a later-described cover layer 10 covering the blade 7 after the piece 3 is cast. The slit 8 communicates with a vent opening 9 connected to the outside of the piece 3 (mold 1).

The gap by the slit 8 is preferably in a range of 0.02 mm to 0.10 mm so as to secure sufficient venting through the slit 8 and to prevent the development of spews at the same time. Note that the gap by the slit 8 is depicted as a large gap with an exaggeration in FIG. 4.

The vent opening 9 of this embodiment is formed by removing a later-described string-shaped vent opening forming member after the piece 3 is cast. The size of the vent opening 9 is about 1 mm to 10 mm in terms of its outer diameter. Although the vent opening 9 is bent in FIG. 4, it is possible to have a straight vent opening 9.

When a green tire is vulcanized by using the mold 1 obtained by assembling the pieces 3 as above, unnecessary air and gas are discharged into the vent openings 9 through the slits 8 and further discharged to the outside of the mold 1 through the end surfaces of the sectors 2 and the like. Because appropriate venting can be secured during the vulcanizing as described above, vulcanizing-related tire defects are prevented.

A method of manufacturing the above piece 3 will be illustrated below.

Figure 6:
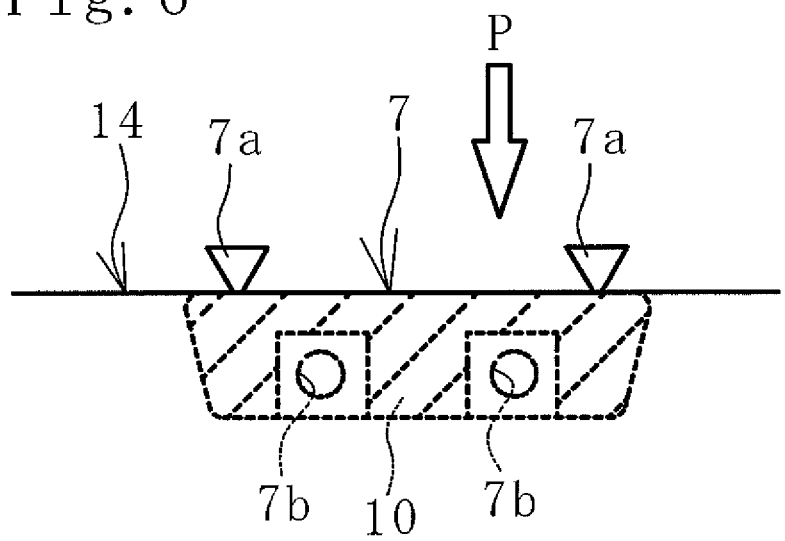
FIG. 6 is an explanatory view illustrating a step of pouring plaster over the surface of a rubber mold with anchor portions of blades protruding therefrom.

As illustrated in FIG. 6, the blades 7 each with anchor portions 7a protruding from one end thereof are embedded in a rubber mold 14 such that only the anchor portions 7a protrude from the surface of the rubber mold 14. The rubber mold 14 is formed by transferring the surface shape of a master mold.

Figure 7:
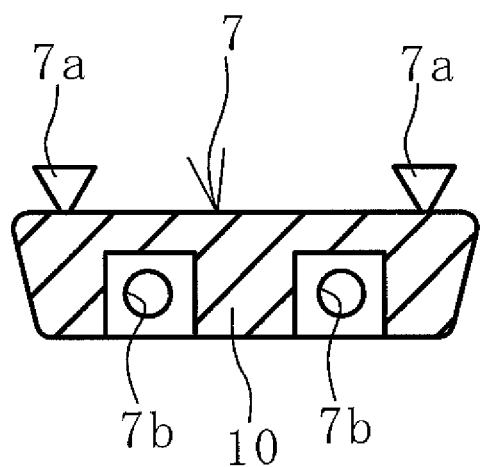
FIG. 7 is a front view illustrating the blade in FIG. 6.

Each anchor portion 7a is provided to fix its blade 7 at a desired position when the blade 7 is mounted on a surface 12a of a plaster mold 12, and is removed from the body portion of the blade 7 in a subsequent step. Thus, as illustrated in FIG. 7, the anchor portion 7a is preferably connected to the body portion of the blade 7 (the portion other than the anchor portion 7a) in a shape that becomes narrower toward it. In this embodiment, the anchor portion 7a is formed in a triangular shape and connected at a vertex thereof to the body portion of the blade 7.

The surface of the blade 7 is preferably covered with the cover layer 10 in advance. In the drawings, the cover layer 10 is shown by a shaded area. Moreover, the blade 7 (body portion) is provided with through-holes 7b. The surfaces of portions of the blade 7 around the through-holes 7b are preferably left exposed and not covered with the cover layer 10. Since the slit 8 is formed by removing the cover layer 10 in a subsequent step, the thickness of the cover layer 10 is set in a range of 0.02 mm to 0.10 mm.

The cover layer 10 is made of an easily destructible fire-resistant material that is easily soluble in water or easily collapsible with impact. Examples of the easily destructible fire-resistant material include a solid material containing a facing material, gypsum, and a graphite-based release material, and the like. The facing material is one that functions as a heat insulating material and a protection material for the casting mold by being applied to portions of the casting mold to be in contact with the molten metal. Components of the facing material are water, sodium silicate, vermiculite, mica, and bentonite. Moreover, components of the graphite-based release material are graphite, n-hexane, dimethyl ether, and the like.

Figure 8:
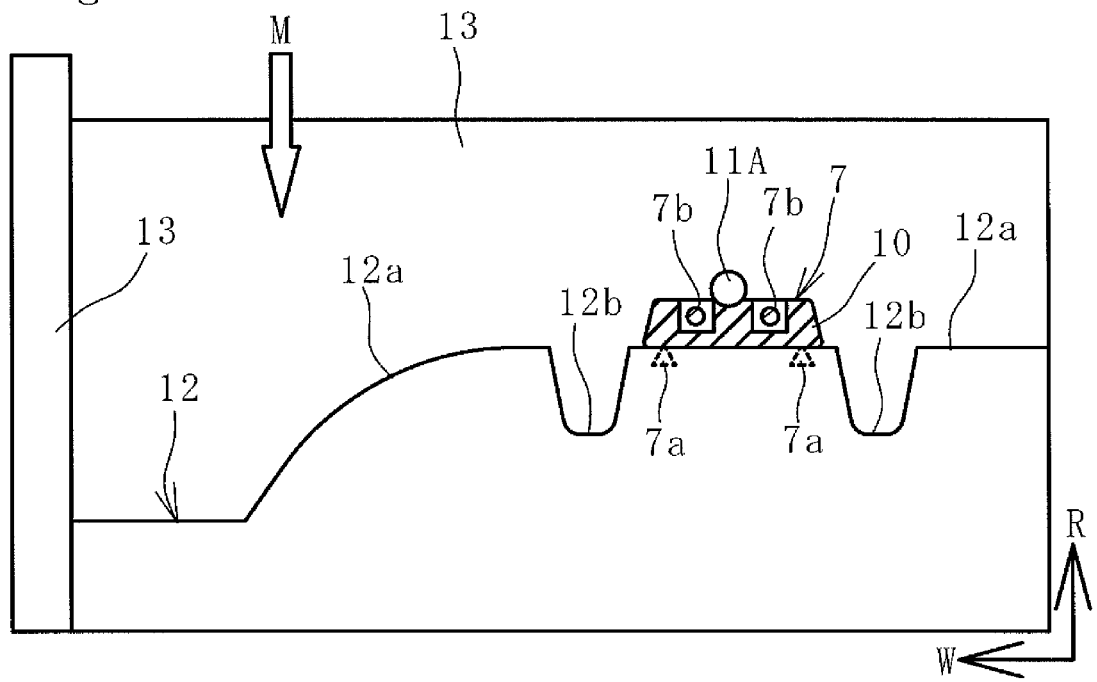
FIG. 8 is an explanatory view illustrating a step of pouring molten metal over the surface of a plaster mold with a vent opening forming member attached to each blade, as seen from the front.

As illustrated in FIG. 6, plaster P is poured over the surface of the rubber mold 14 to manufacture the plaster mold 12 illustrated in FIG. 8, to which the surface shape of the rubber mold 14 is transferred. Grooves 12b in the surface 12a of the plaster mold 12 are portions corresponding to the groove molding protrusions 6 on the mold 1. In the plaster mold 12 manufactured as described above, only the anchor portions 7a are embedded. The body portion of the blade 7 is in a state of being mounted and not embedded. That is, the body portion of the blade 7 is in a state of protruding from and exposed on the surface 12a of the plaster mold 12.

Figure 9:
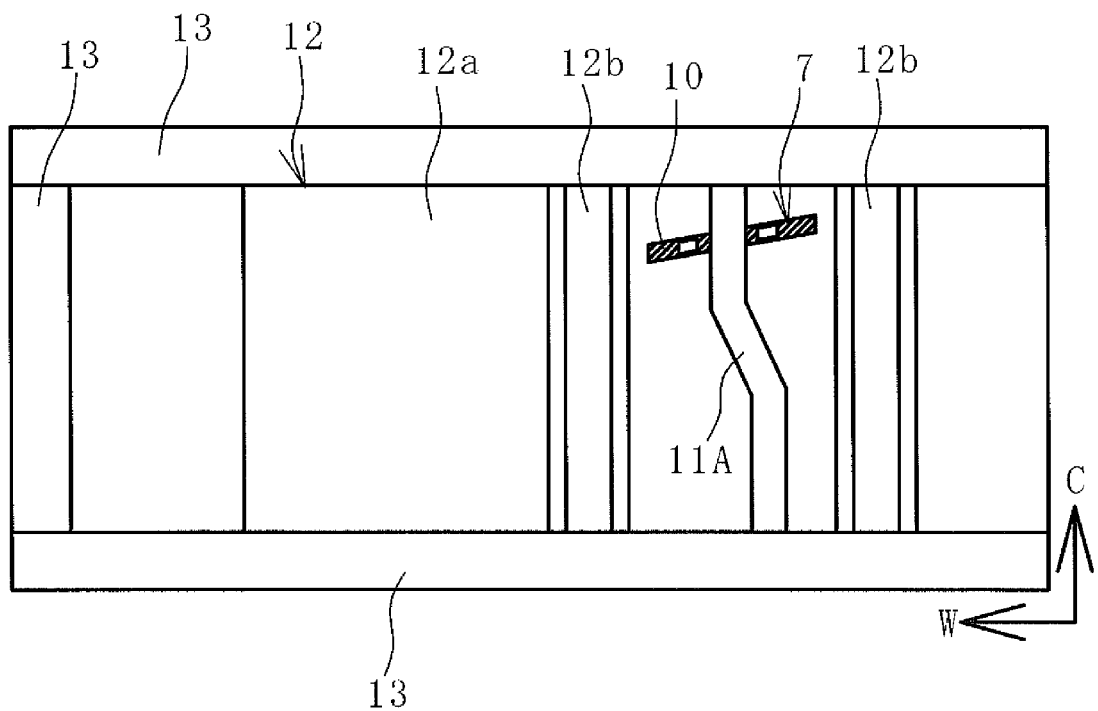
FIG. 9 is an explanatory view showing the step in FIG. 8 as seen from above.

Thereafter, the molten metal M is poured over the surface 12a of the plaster mold 12 to cast the mold 1. In this step, a string-shaped vent opening forming member 11A made of a fire-resistant material for casting is attached to the body portion of each blade 7 mounted on the surface 12a of the plaster mold 12, in such away as to be in contact with the corresponding cover layer 10 as illustrated in FIGS. 8 and 9. Here, the vent opening forming member 11A is extended to such an extent that its ends contact mold frames 13, and is arranged in such a way that part of the vent opening forming member 11A is exposed from the mold 1 when the mold 1 is cast by pouring the molten metal M. Because the vent opening 9 is formed by removing the vent opening forming member 11A in a subsequent step, the thickness of the vent opening forming member 11A is in a range of about 1 mm to 10 mm in terms of its outer diameter.

Figure 10:
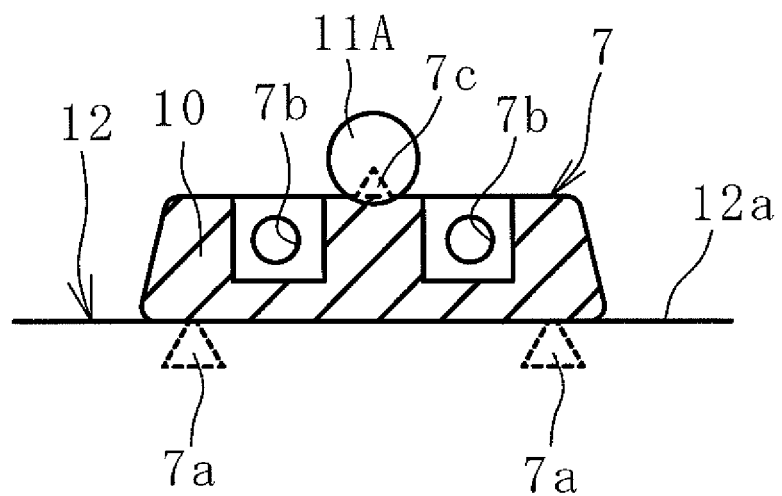
FIG. 10 is a front enlarged view illustrating the blade and the vent opening forming member in FIG. 8.
Figure 11:
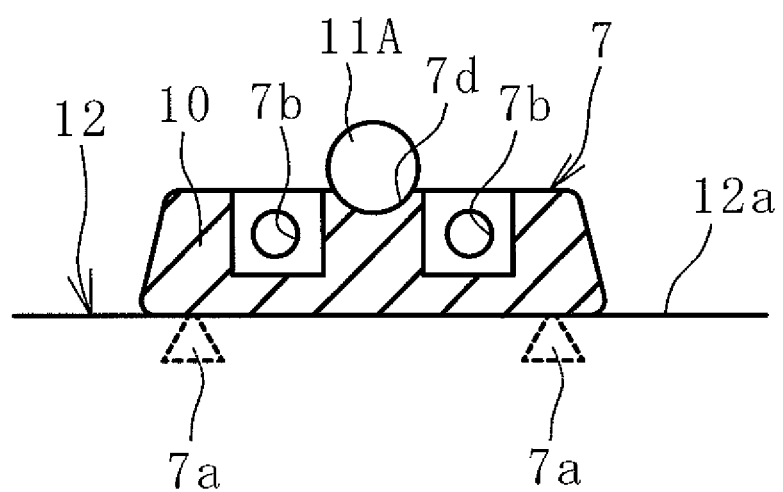
FIG. 11 is a front view showing a modification of the blade in FIG. 10.

As illustrated in FIG. 10, it is also possible to provide a spike portion 7c on the portion (body portion) of the blade 7 mounted on the surface 12a of the plaster mold 12 and thrust the spike portion 7c into the vent opening forming member 11A to attach the vent opening forming member 11A to the blade 7. Alternatively, as illustrated in FIG. 11, it is possible to provide a notched portion 7d in the portion (body portion) of the blade 7 mounted on the surface 12a of the plaster mold 12 and engage the vent opening forming member 11A with the notched portion 7d to attach the vent opening forming member 11A to the blade 7. By providing the spike portion 7c or the notched portion 7d as above, the vent opening forming member 11A can be attached to the blade 7 easily and stably. Accordingly, it is possible to prevent a problem of displacement of the vent opening forming member 11A due to the pouring of the molten metal.

The vent opening forming member 11A is made of a fire-resistant material for casting. The fire-resistant material for casting is provided to a portion to be in contact with the molten metal such as the surface of an aluminum melting furnace or a mold frame and functions to prevent erosive wear by molten aluminum and the like. Examples of the fire-resistant material for casting include a mold seal and a heat insulating material for casting.

Main components of the mold seal are kaolinite, bentonite, talc, and a mineral oil. Main components of the heat insulating material for casting are alumina and silica. The mold seal is flexible and easily deformable into various shapes. Thus, by using the mold seal as the vent opening forming member 11A, it is possible to form the vent opening 9 in a given shape such as a vent opening bent in such a way that it is impossible to form through cutting work.

After the molten metal M is poured over the surface 12a of the plaster mold 12 in the above-described state, the molten metal M is solidified, thereby casting the piece 3 to which the shape of the surface 12a of the plaster mold 12 is transferred. Only the anchor portions 7a of each blade 7 protrude from the piece 3 thus cast, and the body portion is embedded in the surface of the piece 3 without protruding therefrom. The body portion of the blade 7 is in a state of being buried and embedded in the piece 3 with the cover layer 10 still covering the body portion. Moreover, the piece 3 is in a state where part of each vent opening forming member 11A is exposed from the end surfaces of the piece 3.

Figure 12:
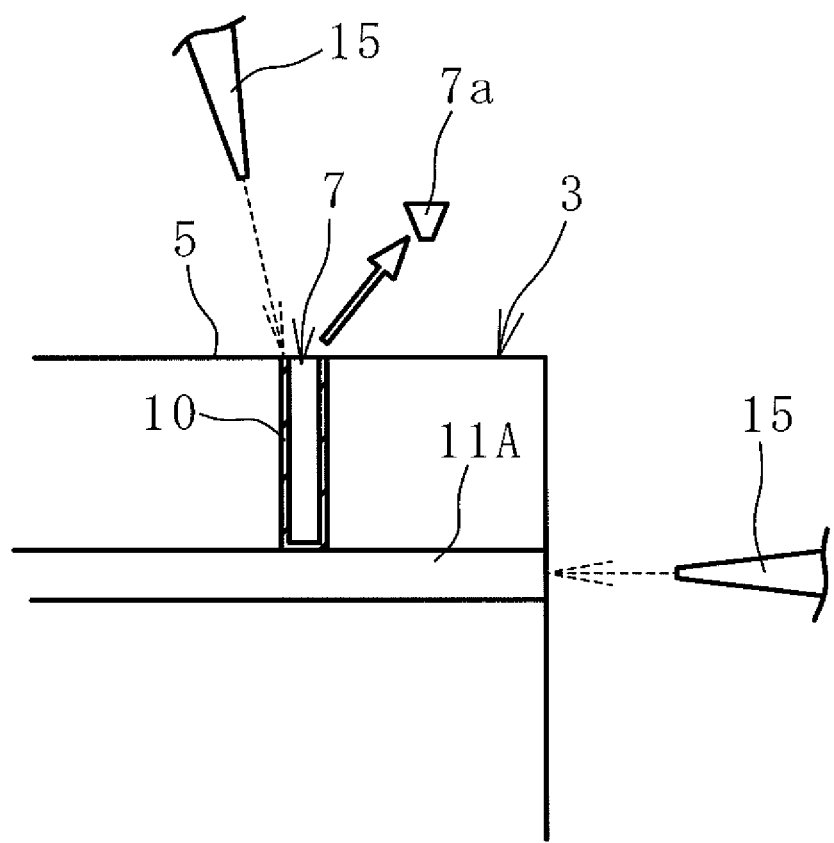
FIG. 12 is a cross-sectional view illustrating a step of removing the anchor portions, cover layers, and the vent opening forming members from the piece after its casting.
Figure 13:
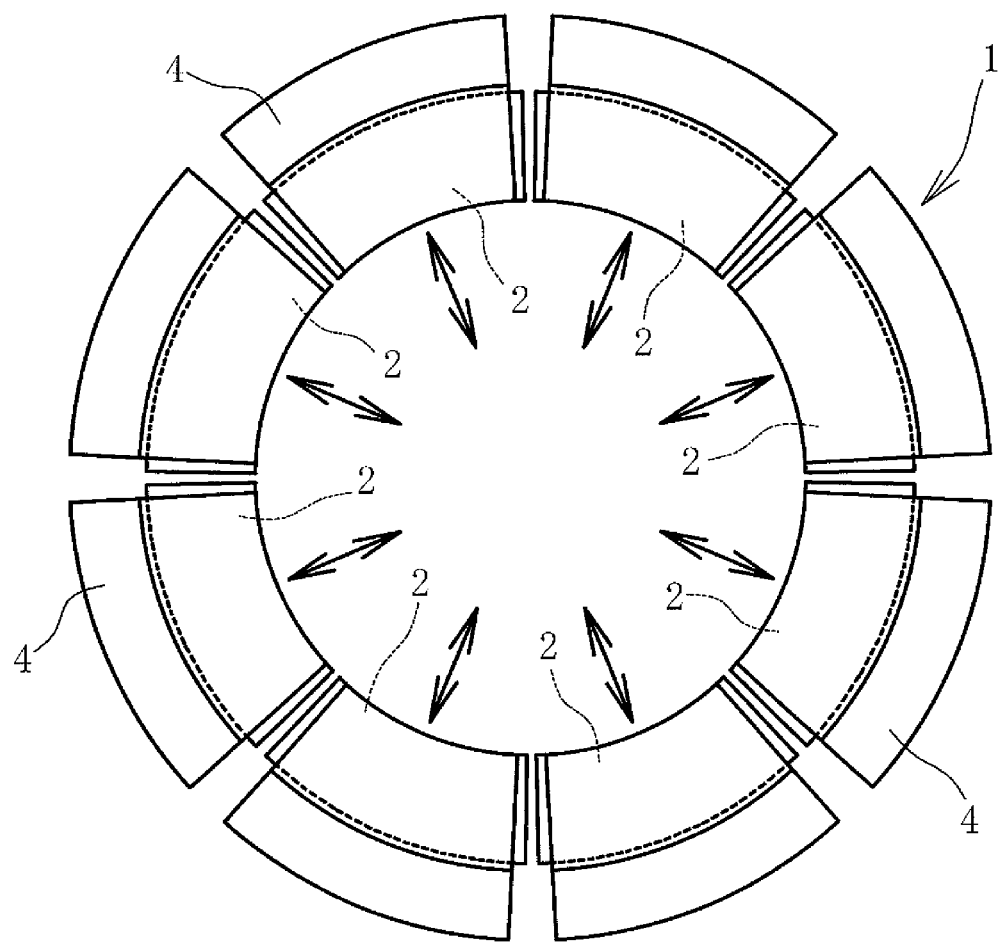
FIG. 13 is a plan view illustrating another tire vulcanizing mold of the present invention.
Figure 14:
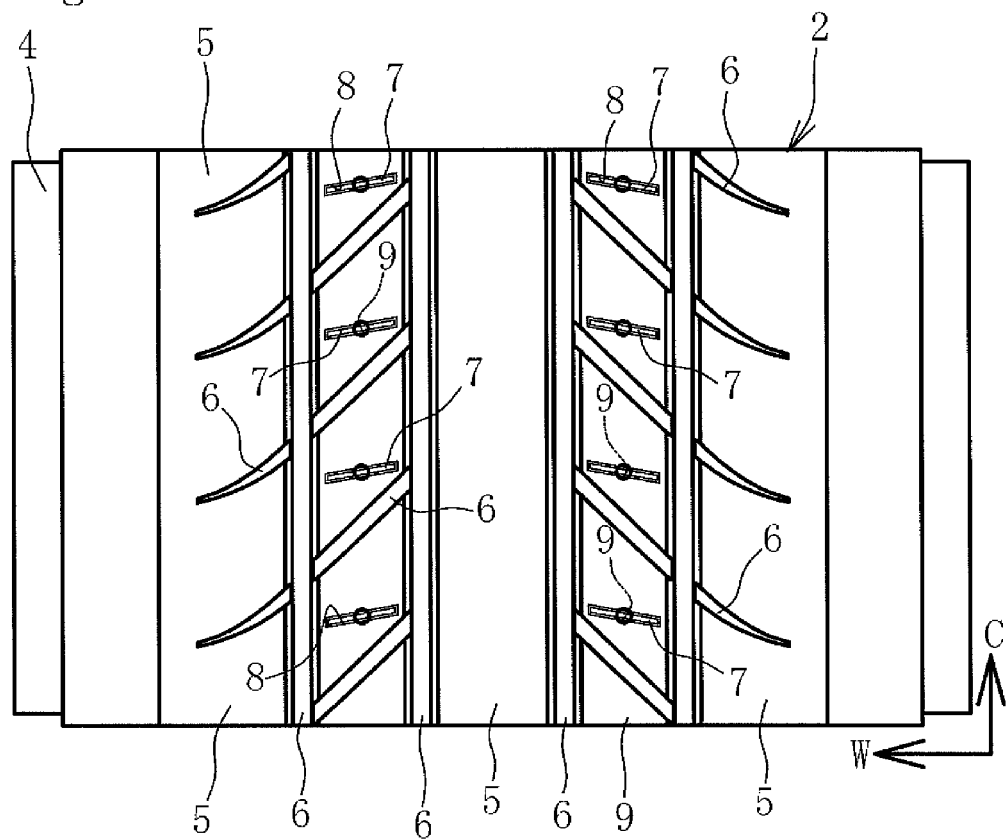
FIG. 14 is a plan view illustrating a sector in FIG. 13.
Figure 15:
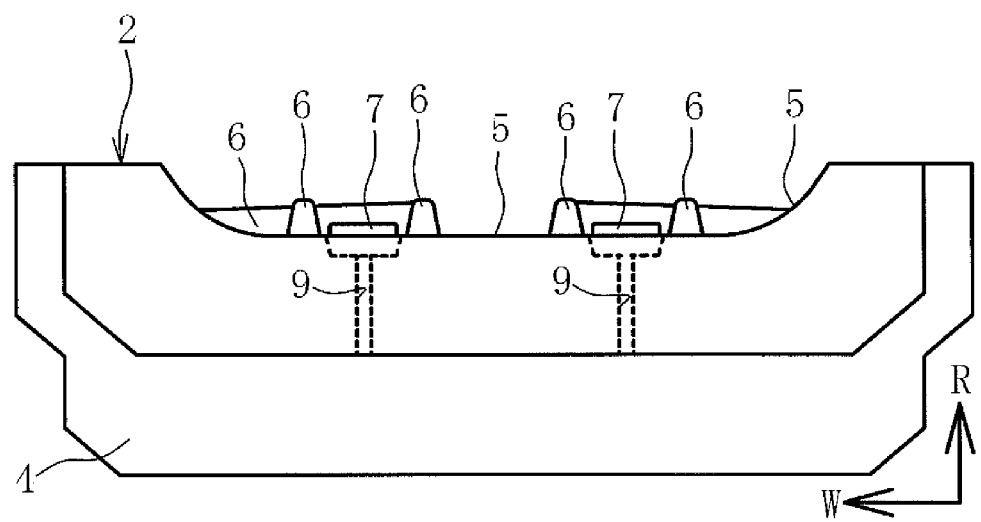
FIG. 15 is a front view of FIG. 14.
Figure 16:
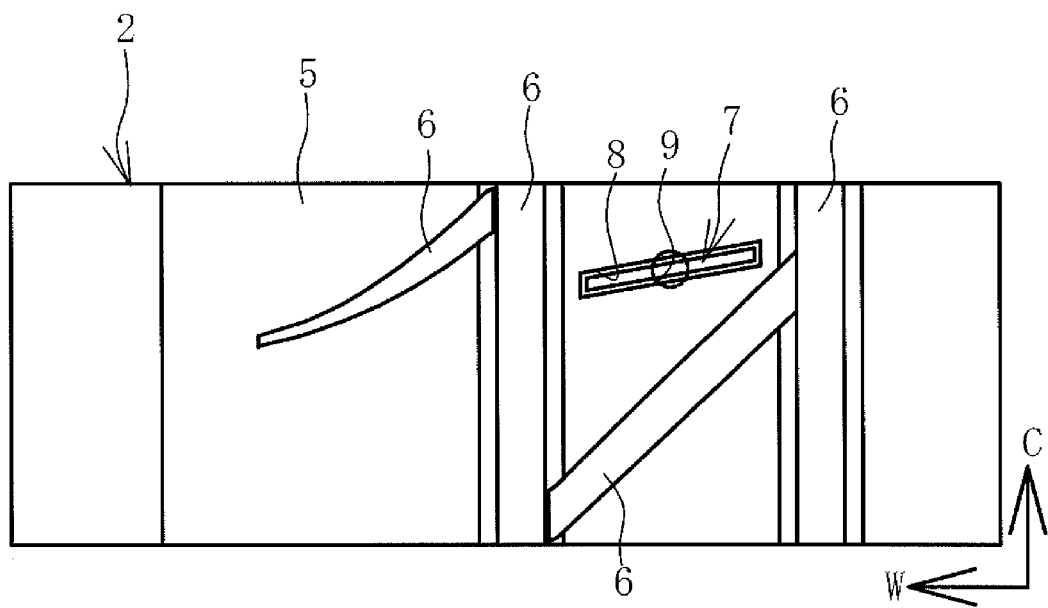
FIG. 16 is a plan view illustrating part of a left half of the sector in FIG. 16.
Figure 17:
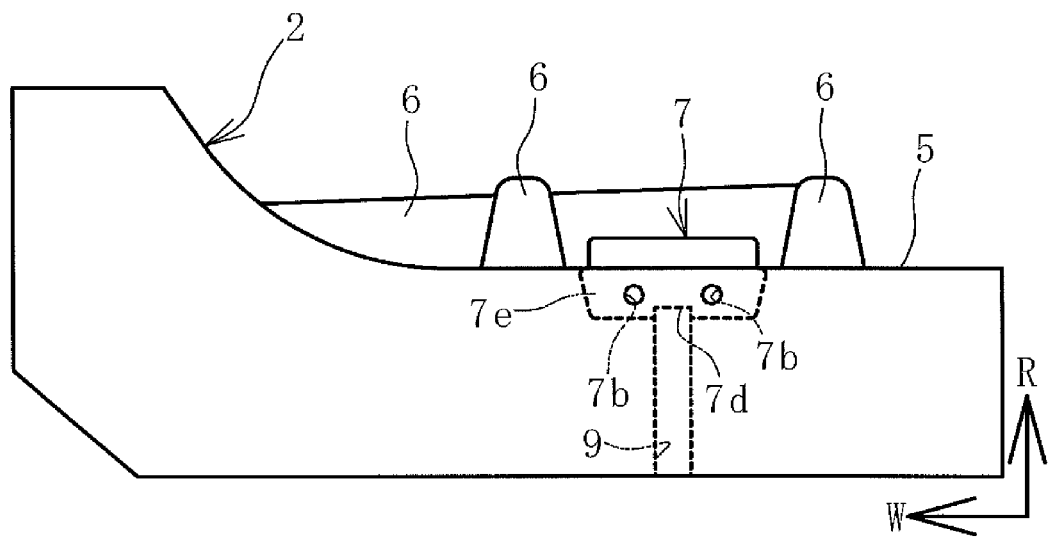
FIG. 17 is a front view of FIG. 16.

Thereafter, as illustrated in FIG. 12, the anchor portions 7a protruding from the surface of the cast piece 3 are removed. The anchor portions 7a are removed either through a manual operation directly using hands, or by use of a tool such a cutting machine or a grinding machine. Once the anchor portions 7a are removed, the upper end of the blade 7 is at the same level as the surface of the piece 3.

Each cover layer 10 and each vent opening forming member 11A that are being embedded in the piece 3 are also removed. The cover layer 10 and the vent opening forming member 11A are removed, for example, by applying high-pressure water injected from an injection nozzle 15 to the cover layer 10 and the vent opening forming member 11A. The region from which the cover layer 10 is removed becomes the slit 8, while the region from which the vent opening forming member 11A is removed becomes the vent opening 9. Because part of the vent opening forming member 11A has been exposed from the end surfaces of the piece 3, the vent opening 9 thus formed is in a state of being connected to the outside of the piece 3. Moreover, because the vent opening forming member 11A has been in contact with the cover layer 10, the slit 8 and the vent opening 9 communicate with each other.

As described above, each slit 8 opening at the surface of the piece 3 can be easily formed by the casting step of pouring and solidifying the molten metal M over the surface 12a of the plaster mold 12, and the removal step of removing the anchor portions 7a and the cover layer 10.

In addition, in the present invention, each blade 7 can be mounted and fixed at a desired position on the surface 12a of the plaster mold 12 by means of the anchor portions 7a provided at one end of the blade 7. Accordingly, each slit 8 can be formed at a desired position in the surface of the piece 3.

Assume, for example, that the piece 3 is cast by pouring the molten metal M in a state where part of the blades 7 is simply embedded in the plaster mold 12 and thus the blades 7 protrude from the surface 12a of the plaster mold 12. In this case, part of the blades 7 protrudes from the surface of the piece 3. Thus, when a tire is vulcanized by using this piece 3, an unintended dent is formed in the surface of the tire by the protruding part of each blade 7. Then, to prevent the formation of the unintended dent in the vulcanized tire, the blade 7 must be mounted on the surface 12a of the plaster mold 12 without being embedded in the plaster mold 12. However, the blade 7 cannot be fixed at a desired position if it is simply mounted on the surface 12a of the plaster mold 12.

The present invention solves this problem by providing the anchor portions 7a at one end of each blade 7 which are removed in a subsequent step.

Further, in this embodiment, each vent opening 9 can be formed easily by the casting step and the removal step of removing the vent opening forming member 11A. Accordingly, no cutting work is required for forming the vent opening 9 after casting the piece 3.

The piece 3 may be cast by pouring the molten metal M over the surface 12a of the plaster mold 12 without attaching the vent opening forming members 11A to the blades 7. In this case, after the piece 3 is cast, the slits 8 are formed by removing the cover layers 10, while the vent openings 9 need to be formed in a separate step. To do so, the piece 3 is subject to cutting work to form the vent openings 9 that communicate with the slits 8 and are connected to the outside of the piece 3.

In the illustrated embodiment, the piece 3 is cast by pouring the molten metal M in a state where the surfaces of the portions of each blade 7 around its through-holes 7b are left exposed. Thus, even when the cover layer 10 is removed after the piece 3 is cast, the portions around the through-holes 7b are tightly bonded to the solidified molten metal M, so that the blade 7 is firmly fixed to the piece 3 and therefore less likely to fall off.

Next, another tire vulcanizing mold manufacturing method and tire vulcanizing mold of the present invention will be described based on an embodiment shown in drawings.

As illustrated in FIGS. 13 to 17, this mold 1 is a sectional type formed of multiple sectors 2 assembled annularly. Back blocks 4 are attached to the back surfaces of the sectors 2, respectively. The inner peripheral surfaces of the sectors 2 serve as a tire molding surface 5. Each sector 2 is formed by solidifying molten metal M being a metal material such as aluminum or an aluminum alloy in a molten state.

On the tire molding surface 5, groove molding protrusions 6 for forming a tire's grooves are provided integrally with the sectors 2. Moreover, blades 7 made of stainless steel or the like protrude from the tire molding surface 5. Each blade 7 of this embodiment is a sipe blade which forms a sipe in the surface of a tire to be manufactured. Specifically, the blade 7 protrudes while its root portion 7e is buried in the tire molding surface 5. The thickness of the blade 7 is about 0.4 mm to 1.2 mm.

A slit 8 is provided around the root portion 7e of each blade 7. This slit 8 is formed by removing a later-described cover layer 10 covering the root portion 7e after the sector 2 is cast. The slit 8 extends toward the back surface of the sector 2 (mold 1) and communicates with a vent opening 9 connected to the outside of the sector 2.

The gap by the slit 8 is preferably in a range of 0.02 mm to 0.10 mm so as to secure sufficient venting through the slit 8 and to prevent the development of spews at the same time. Note that the gap by the slit 8 is depicted larger than the actual one in FIG. 16.

The vent opening 9 is formed by removing, after the sector 2 is cast, a later-described vent opening forming member 11B which is attached upright to the blade 7 and set in contact with the cover layer 10. The size of the vent opening 9 is about 2 mm to 10 mm in terms of its outer diameter.

When a green tire is vulcanized by using the mold 1 obtained by assembling the sectors 2 as above, unnecessary air and gas are discharged into the vent openings 9 through the slits 8 and further discharged to the outside of the mold 1 through the end surfaces of the sectors 2 and the like. Because appropriate venting can be secured during the vulcanizing as described above, vulcanizing-related tire defects are prevented.

A method of manufacturing the above sector 2 is as follows.

Figure 18:
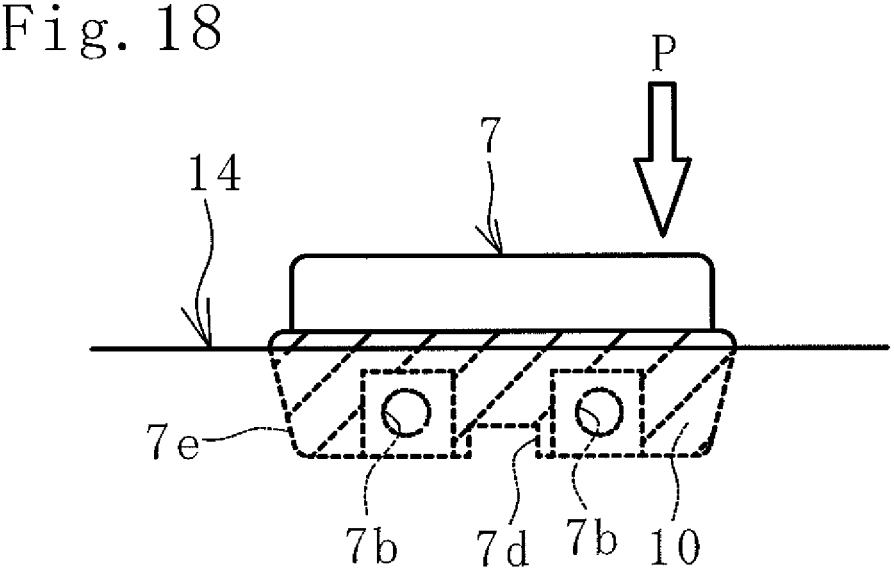
FIG. 18 is an explanatory view illustrating a step of pouring plaster over the surface of a rubber mold with root portions of blades protruding therefrom.

As illustrated in FIG. 18, the root portion 7e of each blade 7 is embedded in a rubber mold 14, so that the blade 7 protrudes from the surface of the rubber mold 14. The rubber mold 14 is formed by transferring the surface shape of a master mold.

The surface of the root portion 7e of the blade 7 is preferably covered with the cover layer 10 in advance. In the drawings, the cover layer 10 is shown by a shaded area. The root portion 7e of the blade 7 is provided with through-holes 7b and a notched portion 7d. The surfaces of portions of the blade 7 around the through-holes 7b are preferably left exposed and not covered with the cover layer 10. Since the slit 8 is formed by removing the cover layer 10 in a subsequent step, the thickness of the cover layer 10 is set in a range of 0.02 mm to 0.10 mm.

The cover layer 10 is made of an easily destructible fire-resistant material that is easily soluble in water or easily collapsible with impact. Examples of the easily destructible fire-resistant material include a solid material containing a facing material, gypsum, and a graphite-based release material, and the like. The facing material is one that functions as a heat insulating material and a protection material for the casting mold by being applied to portions of the casting mold to be in contact with the molten metal. Components of the facing material are water, sodium silicate, vermiculite, mica, and bentonite. Moreover, components of the graphite-based release material are graphite, n-hexane, dimethyl ether, and the like.

Figure 19:
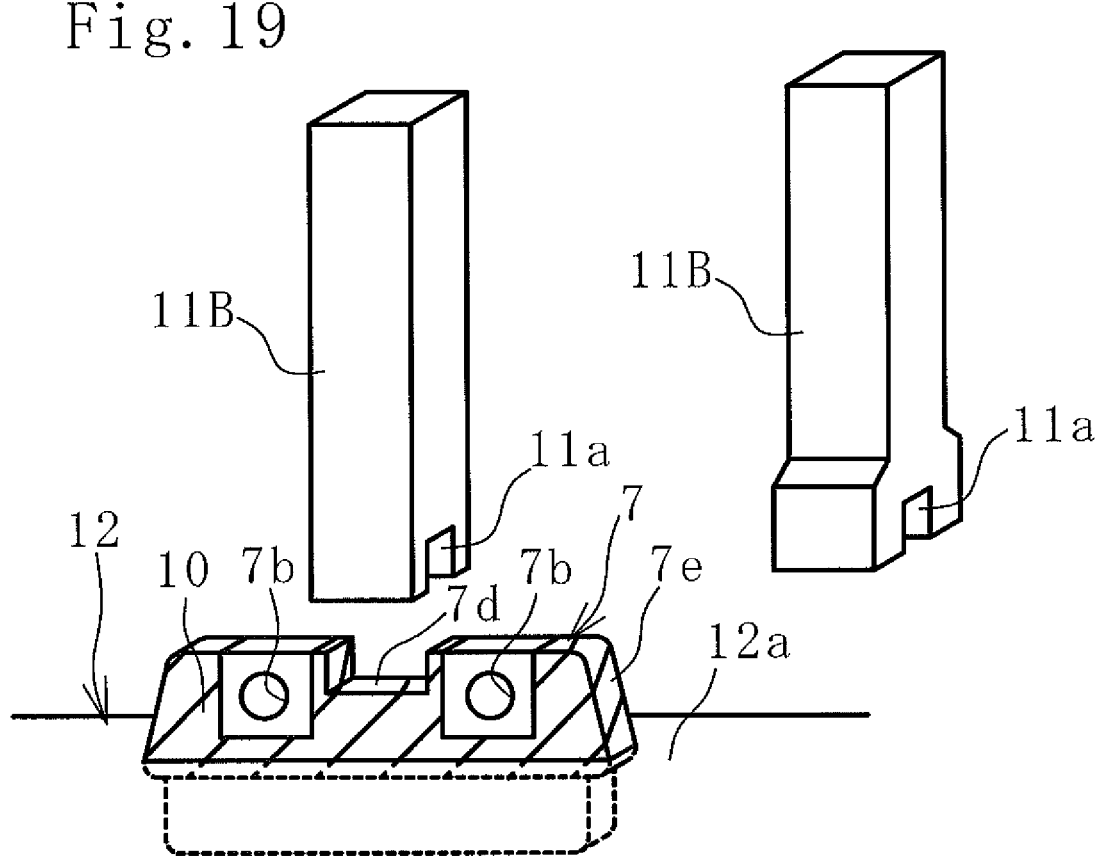
FIG. 19 is a perspective view illustrating the blades protruding from the surface of a plaster mold and vent opening forming members to be attached to the blades.

Plaster P is poured over the surface of the rubber mold 14 to manufacture a plaster mold 12 to which the surface shape of the rubber mold 14 is transferred. As illustrated in FIG. 19, the blades 7 protrude from a surface 12a of the plaster mold 12 thus manufactured. The root portion 7e of each blade 7 is in a state of protruding from and exposed on the surface 12a of the plaster mold 12.

A rod-shaped vent opening forming member 11B made of an easily destructible fire-resistant material is attached upright to each blade 7. In this step, the vent opening forming member 11B is attached to the blade 7 protruding from the surface 12a of the plaster mold 12, in such a way as to be in contact with the cover layer 10 covering the root portion 7e. The easily destructible fire-resistant material making up the vent opening forming member 11B is preferably gypsum.

The blade 7 is provided with the notched portion 7d, and the vent opening forming member 11B is also provided with a notched portion 11a in a lower end portion thereof. By engaging these notched portions 7d and 11a with each other to make the vent opening forming member 11B stand upright through the notched portions 7d and 11a, the vent opening forming member 11B can be attached firmly to the blade 7. In this way, it is easy to prevent displacement of the upright vent opening forming member 11B at the time of pouring the molten metal M.

The lower end portion in which the notched portion 11a is provided may be made thicker than the other portion, like a vent opening forming member 11B shown on the right side of FIG. 19. In this way, the notched portion 11a is less likely to be damaged when the vent opening forming member 11B attached upright to the blade 7 receives external force.

Although the notched portions 7d and 11a are provided to the blade 7 and the vent opening forming member 11B, a notched portion may be provided to at least one of the blade 7 and the vent opening forming member 11B. Moreover, the displacement of the upright vent opening forming member 11B can be prevented more securely by using fire-resistant adhesive for the attachment of the vent opening forming member 11B to the blade 7.

Figure 20:
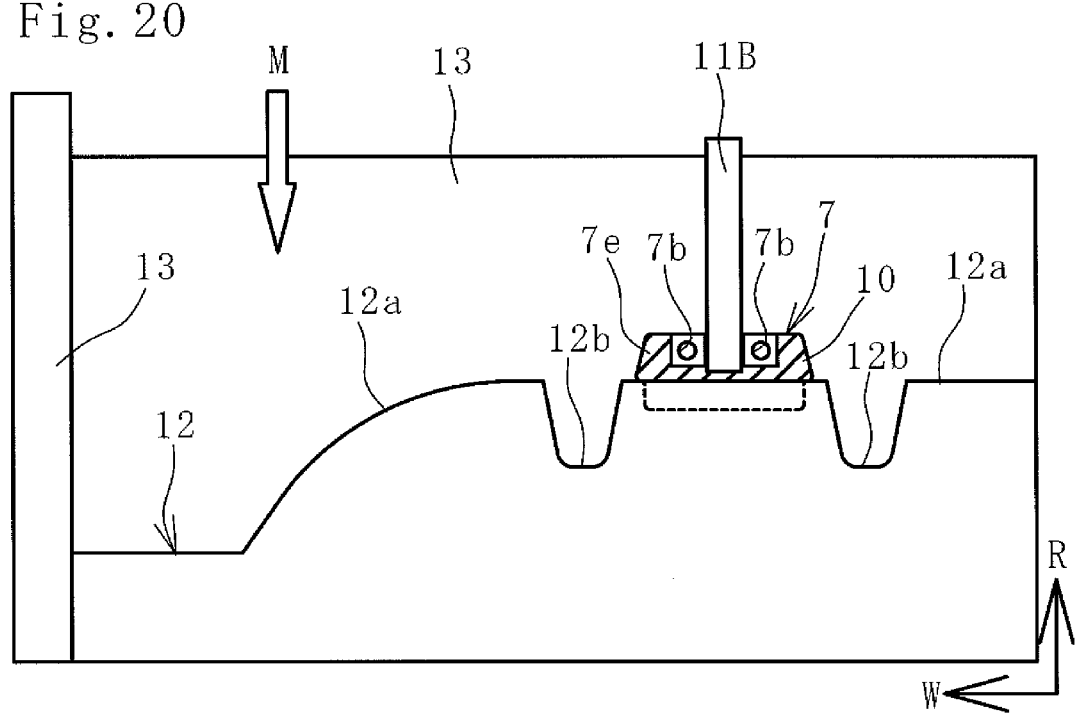
FIG. 20 is an explanatory view illustrating a step of pouring molten metal over the surface of the plaster mold with the blades equipped with the vent opening forming members protruding therefrom, as seen from the front.
Figure 21:
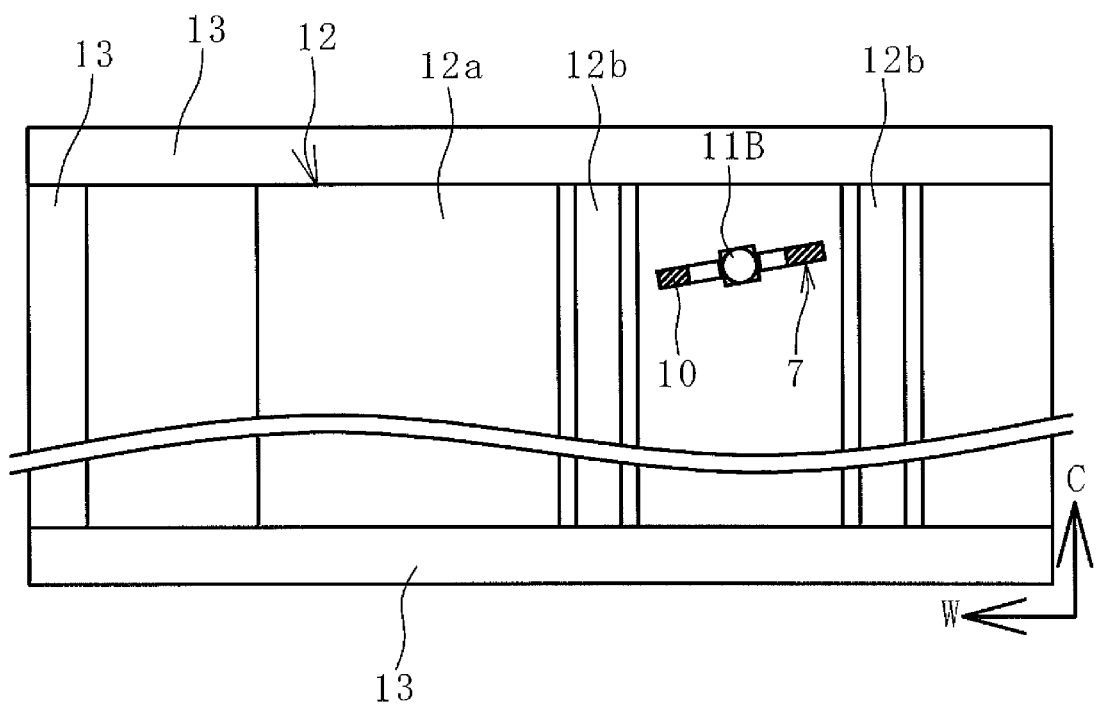
FIG. 21 is an explanatory view showing the step in FIG. 20 as seen from above.

Thereafter, as illustrated in FIGS. 20 and 21, the molten metal M is poured over the surface 12a of the plaster mold 12 to cast the mold 1. Because the vent opening 9 is formed by removing the vent opening forming member 11B in a subsequent step, the thickness of the vent opening forming member 11B is in a range of about 2 mm to 10 mm in terms of its outer diameter.

As described above, the molten metal M is poured over the surface 12a of the plaster mold 12 to which the vent opening forming members 11B are attached in such a way as to extend toward the back surface of the mold 1 to be cast. Then, the molten metal M is solidified, thereby casting the sector 2 to which the shape of the surface 12a of the plaster mold 12 is transferred. The sector 2 thus cast is in a state where the blades (sipe blades) 7 project from the front surface of the sector 2 (tire molding surface 5) while part of the vent opening forming members 11B is exposed from the back surface of the sector 2. The root portion 7e of each blade 7 is in a state of being buried in the sector 2 with the cover layer 10 still covering the root portion 7e. Each vent opening forming member 11B is also in a state of being buried in the sector 2.

Figure 22:
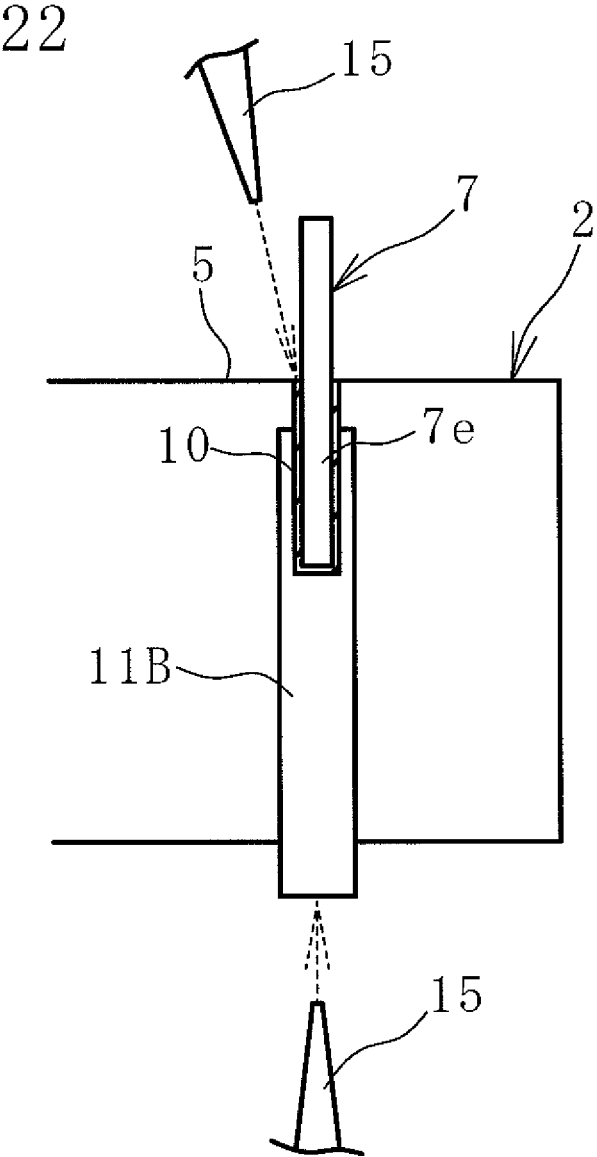
FIG. 22 is a cross-sectional view illustrating a step of removing cover layers and the vent opening forming members from the sector after its casting.

Thereafter, each cover layer 10 and each vent opening forming member 11B buried in the cast sector 2 are removed. The cover layer 10 and the vent opening forming member 11B are removed, for example, by applying high-pressure water injected from an injection nozzle 15 to the cover layer 10 and the vent opening forming member 11B as illustrated in FIG. 22. The region from which the cover layer 10 is removed becomes the slit 8, while the region from which the vent opening forming member 11B is removed becomes the vent opening 9. The vent opening 9 thus formed is in a state of being connected to the outside of the sector 2. Because the vent opening forming member 11B has been in contact with the cover layer 10, the slit 8 and the vent opening 9 communicate with each other.

An upper end portion of each vent opening forming member 11B is exposed from the surface of the molten metal M when the molten metal M is poured over the surface 12a of the plaster mold 12. As a result, the upper end portion of the vent opening forming member 11B is exposed from the back surface of the sector 2. Accordingly, the vent opening forming member 11B can be removed readily from the exposed portion.

Figure 23:
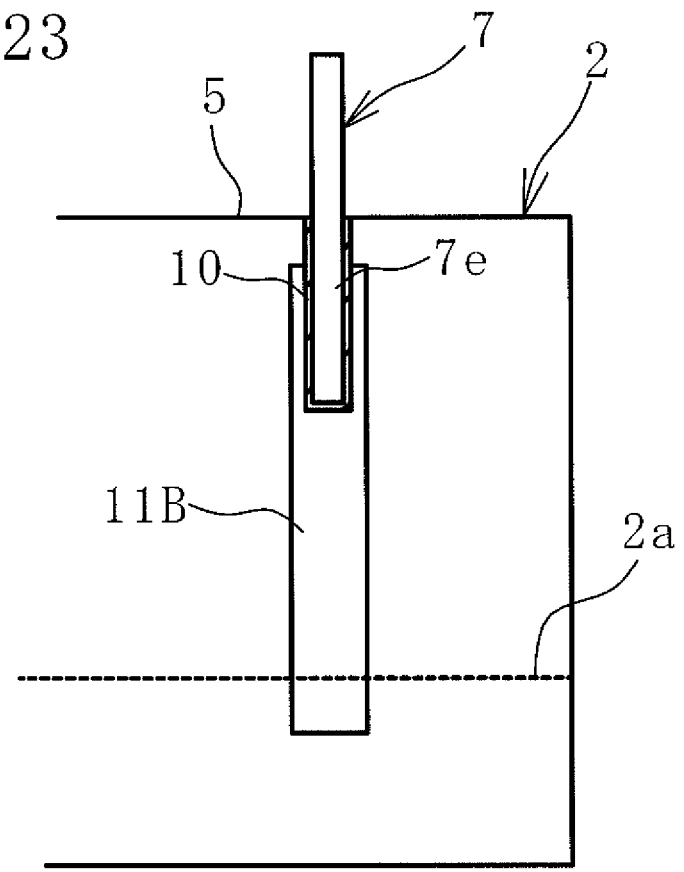
FIG. 23 is a cross-sectional view illustrating a step of cutting the rear surface side of the cast sector to expose the vent opening forming members buried therein to the outside of the mold.

In the case where the vent opening forming member 11B is embedded in the molten metal M above its upper end when the molten metal M is poured over the surface 12a of the plaster mold 12, cast is a sector 2 in which the vent opening forming member 11B is buried entirely. In this case, as illustrated in FIG. 23, the back surface side of this sector 2 is cut along a cutting line 2a after the casting, so that the buried vent opening forming member 11B is exposed to the outside of the sector 2. The vent opening forming member 11B is removed from this exposed portion.

As a result, the vent opening forming member 11B can be exposed from the back surface of the sector 2 simultaneously with the machining of the back surface side of the sector 2. Thus, a sector 2 with the final-specification thickness, i.e. a thin sector 2 can be subjected to the operation of removing the vent opening forming member 11B, meaning that the length of the vent opening forming member 11B to be removed is shortened. Accordingly, the time for the removal operation can be shortened.

As described above, each slit 8 and each vent opening 9 constituting a vent mechanism can be formed easily in the sector 2 by the casting step of pouring and solidifying the molten metal M over the surface 12a of the plaster mold 12 and the removal step of removing the cover layer 10 and the vent opening forming member 11B.

Moreover, in this invention, the formation of the vent openings 9 can be done in terms of the sectors 2, instead of the pieces into which each sector 2 is divided. This is advantageous in reducing the man-hour and length of time required for the processing.

In this embodiment, the sector 2 is cast by pouring the molten metal M in a state where the surfaces of the portions of each blade 7 around its through-holes 7b are left exposed. Thus, even when the cover layer 10 is removed after the mold is cast, the molten metal M solidified around the through-holes 7b is tightly bonded to the root portion 7e of the blade 7, so that the blade 7 is firmly fixed to the mold 1 and therefore less likely to fall off.

Figure 24:
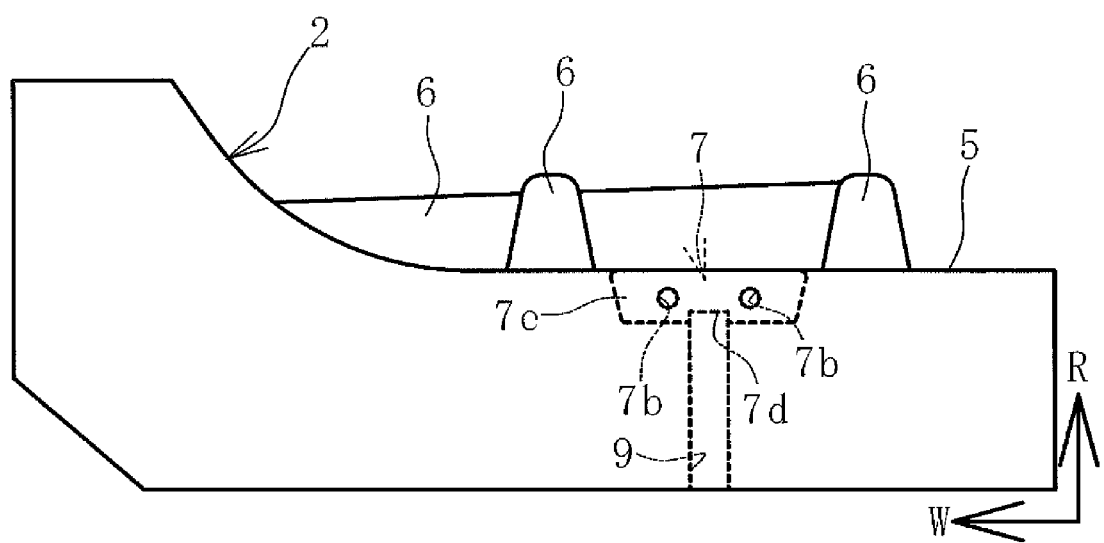
FIG. 24 is a front view illustrating another embodiment of the tire vulcanizing mold.

Another embodiment of the sector 2 (mold 1) illustrated in FIG. 24 differs from the foregoing embodiment only in that each blade 7 is embedded in the tire molding surface 5 without protruding therefrom.

A method of manufacturing the above sector 2 will be illustrated below.

Figure 25:
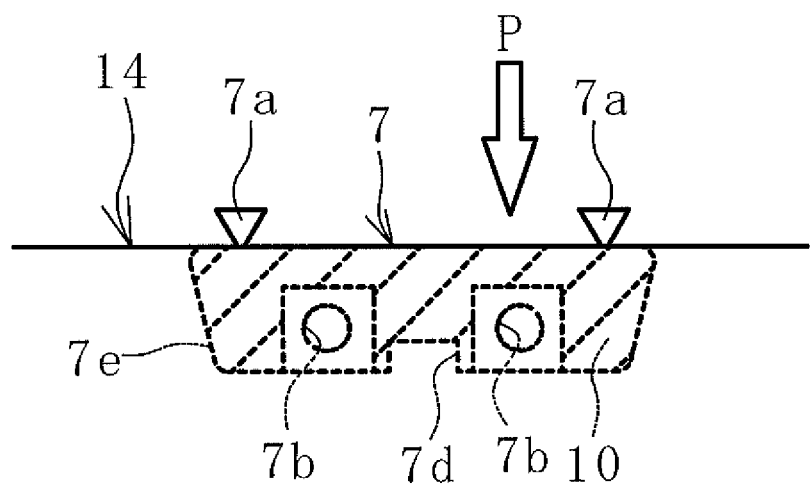
FIG. 25 is an explanatory view illustrating a step of pouring plaster over the surface of a rubber mold with anchor portions of blades protruding therefrom.

As illustrated in FIG. 25, blades 7 each with anchor portions 7a protruding from one end thereof are embedded in a rubber mold 14 such that only the anchor portions 7a protrude from the surface of the rubber mold 14. The rubber mold 14 is formed by transferring the surface shape of a master mold.

Each anchor portion 7a is provided to fix its blade 7 at a desired position when the blade 7 is mounted on a surface 12a of a plaster mold 12, and is removed from the body portion of the blade 7 in a subsequent step. Thus, the anchor portion 7a is preferably connected to the body portion of the blade 7 (the portion other than the anchor portion 7a) in a shape that becomes narrower toward it. In this embodiment, the anchor portion 7a is formed in a triangular shape and connected at a vertex thereof to the body portion of the blade 7.

The surface of the blade 7 is preferably covered with a cover layer 10 in advance. In the drawings, the cover layer 10 is shown by a shaded area. Moreover, the blade 7 (body portion) is provided with through-holes 7b and a notched portion 7d. The surfaces of portions of the blade 7 around the through-holes 7b are preferably left exposed and not covered with the cover layer 10.

As illustrated in FIG. 25, plaster P is poured over the surface of the rubber mold 14 to manufacture the plaster mold 12 to which the surface shape of the rubber mold 14 is transferred. Grooves 12b in the plaster mold 12 are portions corresponding to groove molding protrusions 6 on the mold 1. In the plaster mold 12 manufactured as described above, only the anchor portions 7a are embedded. The body portion of the blade 7 is in a state of being mounted and not embedded. That is, the body portion of the blade 7 is in a state of protruding from and exposed on the surface 12a of the plaster mold 12.

Figure 26:
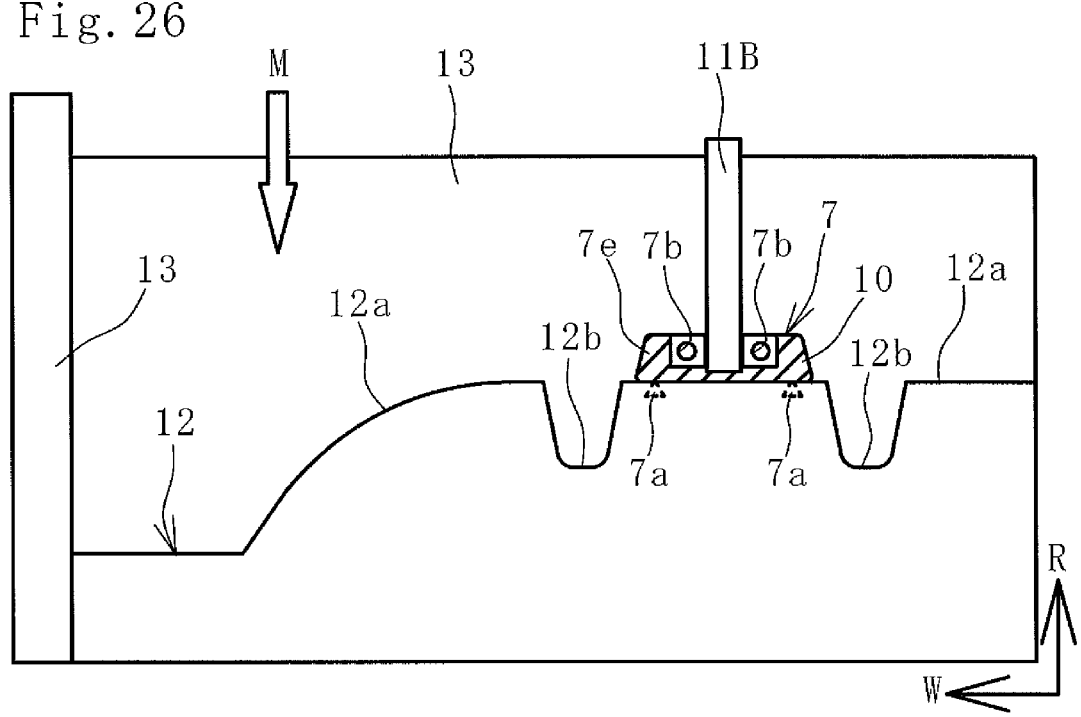
FIG. 26 is an explanatory view illustrating a step of pouring molten metal over the surface of a plaster mold with the blades equipped with vent opening forming members protruding therefrom, as seen from the front.

Thereafter, molten metal M is poured over the surface 12a of the plaster mold 12 to cast the mold 1. In this step, as illustrated in FIG. 26, a rod-shaped vent opening forming member 11B made of an easily destructible fire-resistant material is attached upright to each blade 7 and set in contact with the cover layer 10. Here, the vent opening forming member 11B is attached to the body portion of the blade 7 protruding from the surface 12a of the plaster mold 12 while being set in contact with the cover layer 10. As in the foregoing embodiment, by engaging the notched portion 7d of the blade 7 and a notched portion 11a in a lower end portion of the vent opening forming member 11B with each other to make the vent opening forming member 11B stand upright through the notched portions 7d and 11a, the vent opening forming member 11B can be attached firmly to the blade 7.

After the molten metal M is poured over the surface 12a of the plaster mold 12 in the above-described state, the molten metal M is solidified, thereby casting the sector 2 to which the shape of the surface 12a of the plaster mold 12 is transferred. Only the anchor portions 7a of each blade 7 protrude from the sector 2 thus cast, and the body portion is embedded in the surface of the sector 2 without protruding therefrom. The body portion of the blade 7 is in a state of being buried and embedded in the sector 2 with the cover layer 10 still covering the body portion.

Thereafter, as illustrated in FIG. 27, the anchor portions 7a protruding from the surface of the cast sector 2 are removed.

The anchor portions 7a are removed either through a manual operation directly using hands, or by use of a tool such a cutting machine or a grinding machine. Once the anchor portions 7a are removed, the upper end of the blade 7 is at the same level as the surface of the sector 2.

Each cover layer 10 and each vent opening forming member 11B that are being buried in the sector 2 are also removed, for example, by applying high-pressure water injected from an injection nozzle 15. As a result, slits 8 and vent openings 9 constituting vent mechanisms are formed in the sector 2.

As described above, each slit 8 opening at the surface of the sector 2 and each vent opening 9 extending toward the back surface of the sector 2 can be easily formed by the casting step of pouring and solidifying the molten metal M over the surface 12a of the plaster mold 12, and the removal step of removing the anchor portions 7a, the cover layers 10, and the vent opening forming members 11B.

In addition, in this embodiment, each blade 7 can be mounted and fixed at a desired position on the surface 12a of the plaster mold 12 by means of the anchor portions 7a provided at one end of the blade 7. Accordingly, each slit 8 can be formed at a desired position in the surface of the sector 2.

Assume, for example, that the sector 2 is cast by pouring the molten metal M in a state where part of the blades 7 is simply embedded in the plaster mold 12 and thus the blades 7 protrude from the surface 12a of the plaster mold 12. In this case, part of the blades 7 protrudes from the surface of the sector 2. Thus, when a tire is vulcanized by using this sector 2, an unintended dent is formed in the surface of the tire by the protruding part of each blade 7. Then, to prevent the formation of the unintended dent in the vulcanized tire, the blade 7 must be mounted on the surface 12a of the plaster mold 12 without being embedded in the plaster mold 12. However, the blade 7 cannot be fixed at a desired position if it is simply mounted on the surface 12a of the plaster mold 12.

This embodiment solves this problem by providing the anchor portions 7a at one end of each blade 7 which are removed in a subsequent step.

EXPLANATION OF REFERENCE NUMERALS 1 mold
2 sector
2a cutting line
3 piece
4 back block
5 tire molding surface
6 groove molding protrusion
7 blade
7a anchor portion
7b through-hole
7c spike portion
7d notched portion
7e root portion
8 slit
9 vent opening
10 cover layer
11A, 11B vent opening forming member
11a notched portion
12 plaster mold
12a surface
12b groove in surface
13 mold frame
14 rubber mold
15 injection nozzle
M molten metal
P plaster

The invention claimed is:

1. A tire vulcanizing mold manufacturing method of manufacturing a mold to which a surface shape of a plaster mold is transferred by pouring molten metal over a surface of the plaster mold and solidifying the molten metal, characterized in that the method comprises the steps of:
   mounting a blade on the surface of the plaster mold, the blade being provided with an anchor portion protruding from one end thereof and mounted in such a way that only the anchor portion is embedded in the plaster mold;
   covering a portion of the blade mounted on the surface of the plaster mold with a cover layer made of an easily destructible fire-resistant material;
   pouring molten metal over the surface of the plaster mold thus obtained to cast a mold to which the surface shape of the plaster mold is transferred and in which the blade is buried;
   removing the anchor portion protruding from a surface of the mold;
   removing the cover layer to form a slit around the blade; and
   making the slit communicate with a vent opening connected to an outside of the mold.

2. The tire vulcanizing mold manufacturing method according to claim 1, wherein
   a string-shaped vent opening forming member made of a fire-resistant material for casting is attached to the blade mounted on the surface of the plaster mold in such a way as to be in contact with the cover layer, and is arranged in such a way that once the mold is cast by pouring the molten metal, part of the vent opening forming member is exposed from the mold; and
   after the mold is cast by pouring the molten metal over the surface of the plaster mold thus obtained, the vent opening forming member is removed to form the vent opening.

3. The tire vulcanizing mold manufacturing method according to claim 2, wherein
   a spike portion is provided on the portion of the blade mounted on the surface of the plaster mold, and
   the spike portion is thrust into the vent opening forming member to attach the vent opening forming member to the blade.

4. The tire vulcanizing mold manufacturing method according to claim 2, wherein
   a notched portion is provided in the portion of the blade mounted on the surface of the plaster mold, and
   the vent opening forming member is engaged with the notched portion to attach the vent opening forming member to the blade.

5. The tire vulcanizing mold manufacturing method according to claim 2, wherein
   a through-hole is provided in the blade, and
   the molten metal is poured in a state where a surface of a portion of the blade around the through-hole is left exposed and not covered with the cover layer.

6. The tire vulcanizing mold manufacturing method according to claim 2, wherein a thickness of the cover layer is from 0.02 mm to 0.10 mm.

7. The tire vulcanizing mold manufacturing method according to claim 1, wherein
   a spike portion is provided on the portion of the blade mounted on the surface of the plaster mold, and
   the spike portion is thrust into the vent opening forming member to attach the vent opening forming member to the blade.

8. The tire vulcanizing mold manufacturing method according to claim 1, wherein
   a notched portion is provided in the portion of the blade mounted on the surface of the plaster mold, and
   the vent opening forming member is engaged with the notched portion to attach the vent opening forming member to the blade.

9. The tire vulcanizing mold manufacturing method according to claim 1, wherein
   a through-hole is provided in the blade, and
   the molten metal is poured in a state where a surface of a portion of the blade around the through-hole is left exposed and not covered with the cover layer.

10. The tire vulcanizing mold manufacturing method according to claim 1, wherein a thickness of the cover layer is from 0.02 mm to 0.10 mm.

11. A tire vulcanizing mold manufacturing method of manufacturing a mold to which a surface shape of a plaster mold is transferred by pouring molten metal over a surface of the plaster mold and solidifying the molten metal, characterized in that the method comprises the steps of:
   covering a portion of a blade protruding from the surface of the plaster mold with a cover layer made of an easily destructible fire-resistant material, the portion of the blade being a portion protruding from the surface of the plaster mold;
   attaching a rod-shaped vent opening forming member upright to the blade in such a way that the vent opening forming member comes in contact with the cover layer, the vent opening forming member being made of an easily destructible fire-resistant material;
   pouring molten metal over the surface of the plaster mold thus obtained to cast a mold to which the surface shape of the plaster mold is transferred and in which the portion of the blade protruding from the surface of the plaster mold and the vent opening forming member are buried;
   removing the cover layer to form a slit around the blade; and
   removing the vent opening forming member to form a vent opening communicating with the slit and extending toward a back surface of the mold.

12. The tire vulcanizing mold manufacturing method according to claim 11, wherein
   a notched portion is provided to at least one of the blade and the vent opening forming member, and
   the vent opening forming member is attached upright to the blade through the notched portion.

13. The tire vulcanizing mold manufacturing method according to claim 12, wherein
   the vent opening forming member is embedded in the molten metal above an upper end thereof when the molten metal is poured over the surface of the plaster mold, and
   after the mold in which the vent opening forming member is buried is cast, a back surface side of the mold is cut to expose the buried vent opening forming member to an outside of the mold.

14. The tire vulcanizing mold manufacturing method according to claim 12, wherein an upper end portion of the vent opening forming member is exposed from a surface of the molten metal when the molten metal is poured over the surface of the plaster mold.

15. The tire vulcanizing mold manufacturing method according to claim 11, wherein the vent opening forming member is embedded in the molten metal above an upper end thereof when the molten metal is poured over the surface of the plaster mold, and after the mold in which the vent opening forming member is buried is cast, a back surface side of the mold is cut to expose the buried vent opening forming member to an outside of the mold.

16. The tire vulcanizing mold manufacturing method according to claim 11, wherein an upper end portion of the vent opening forming member is exposed from a surface of the molten metal when the molten metal is poured over the surface of the plaster mold.

* * * * *